United States Patent [19]

Vassos et al.

[11] 4,081,704
[45] Mar. 28, 1978

[54] POWERED HAND-HELD TOOL WITH UNITARY SUB-ASSEMBLY MOUNTED BY THE TOOL HOUSING SECTIONS

[75] Inventors: Louis J. Vassos, Park Ridge; John W. Heinz, Morton Grove; James R. Hartmann, Chicago, all of Ill.

[73] Assignee: Skil Corporation, Chicago, Ill.

[21] Appl. No.: 657,850

[22] Filed: Feb. 13, 1976

[51] Int. Cl.² .............................................. H02K 7/14
[52] U.S. Cl. ........................................ 310/50; 310/89; 310/42; 74/412 TA; 173/163; 408/239 R
[58] Field of Search ...................... 310/50, 42, 47, 83, 310/89; 322/1; 320/2; 173/163; 408/239, 163, 126, 124; 74/412 A

[56] References Cited

U.S. PATENT DOCUMENTS

| | | | |
|---|---|---|---|
| 2,350,631 | 6/1944 | Mitchell | 74/421 A |
| 3,121,813 | 2/1964 | Pratt | 310/50 |
| 3,134,275 | 5/1964 | Davison | 408/126 |
| 3,213,303 | 10/1965 | Riley | 310/50 |
| 3,325,659 | 6/1967 | Douglas | 310/50 |
| 3,413,498 | 11/1968 | Bowen | 310/47 |
| 3,418,504 | 12/1968 | Paule | 310/50 |
| 3,536,943 | 10/1970 | Bowen | 310/89 |
| 3,546,502 | 12/1970 | Botefuhr | 310/50 |
| 3,651,707 | 3/1972 | Rees | 74/421 A |
| 3,652,879 | 3/1972 | Plunkett | 310/47 |
| 3,691,407 | 9/1972 | Klett | 310/50 |
| 3,694,680 | 9/1972 | Jacyno | 310/50 |
| 3,908,139 | 9/1975 | Duncan | 310/50 |

*Primary Examiner*—R. Skudy
*Attorney, Agent, or Firm*—McDougall, Hersh & Scott

[57] ABSTRACT

A cordless electric drill has a housing formed by two clam-shell sections secured together by a plurality of fasteners. These housing sections define a closed motor and gear compartment which receives a sub-assembly, the latter including a generally U-shaped gear box frame mounting a small D.C. electric motor, a plurality of reduction gears and a spindle. A drill chuck is mounted on the spindle. The sub-assembly and the housing sections include co-operating mounting formations, defined in part by projections and cavities, which mounting formations serve to mount the sub-assembly in place in response to securing the clam-shell housing sections together by the aforesaid fasteners.

9 Claims, 6 Drawing Figures

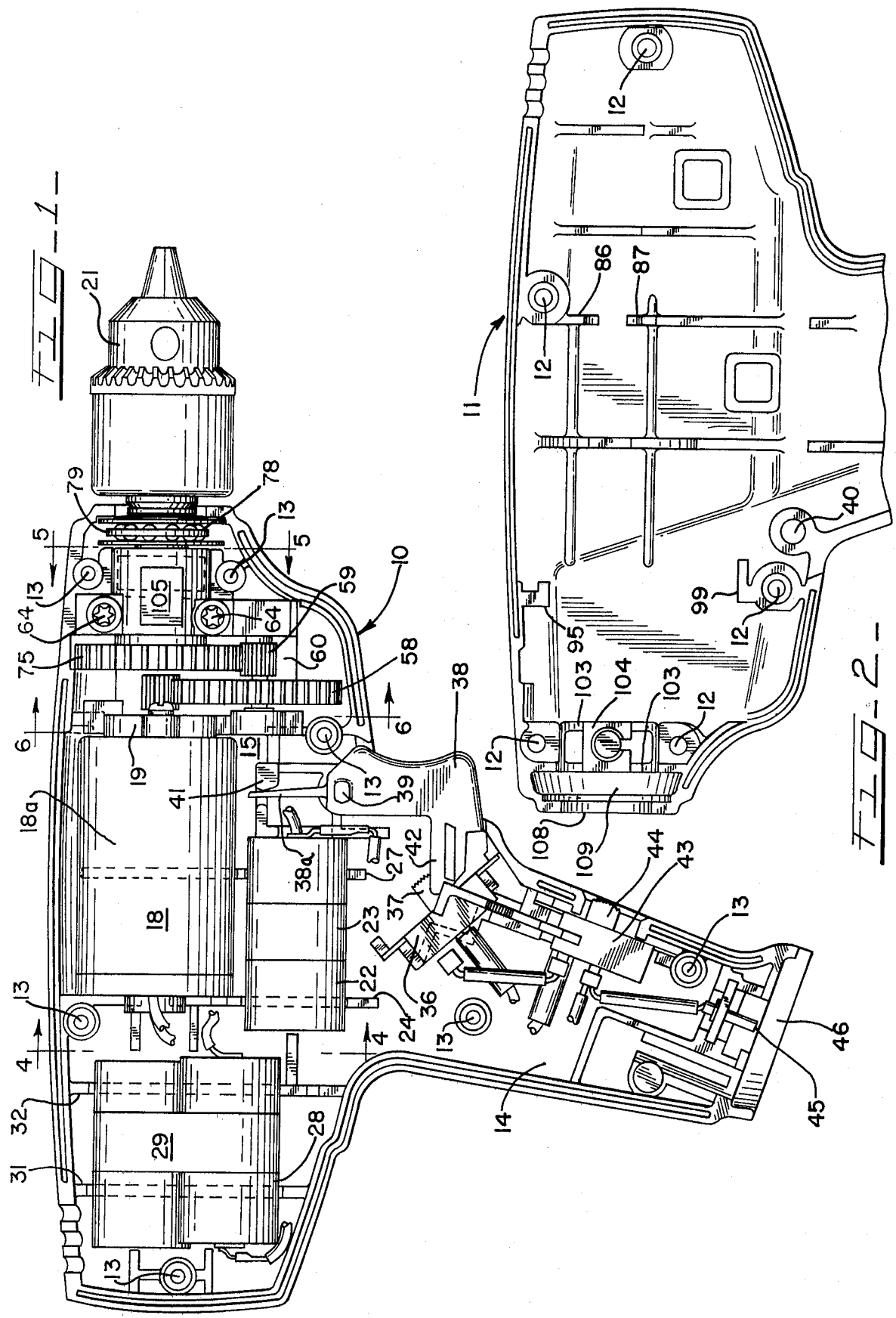

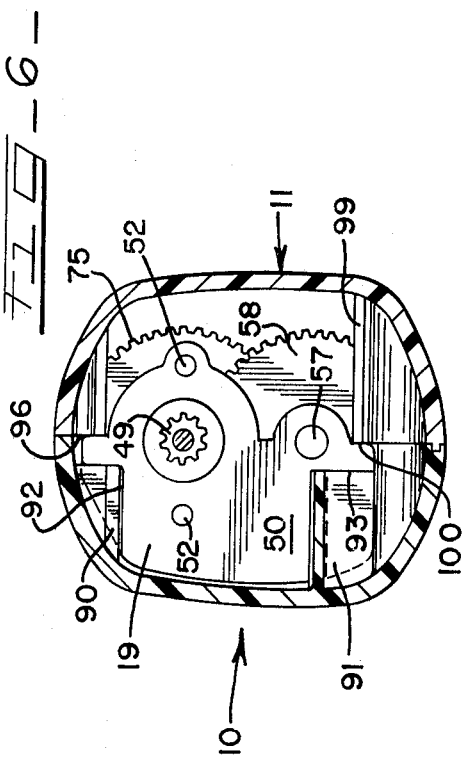
FIG-4-
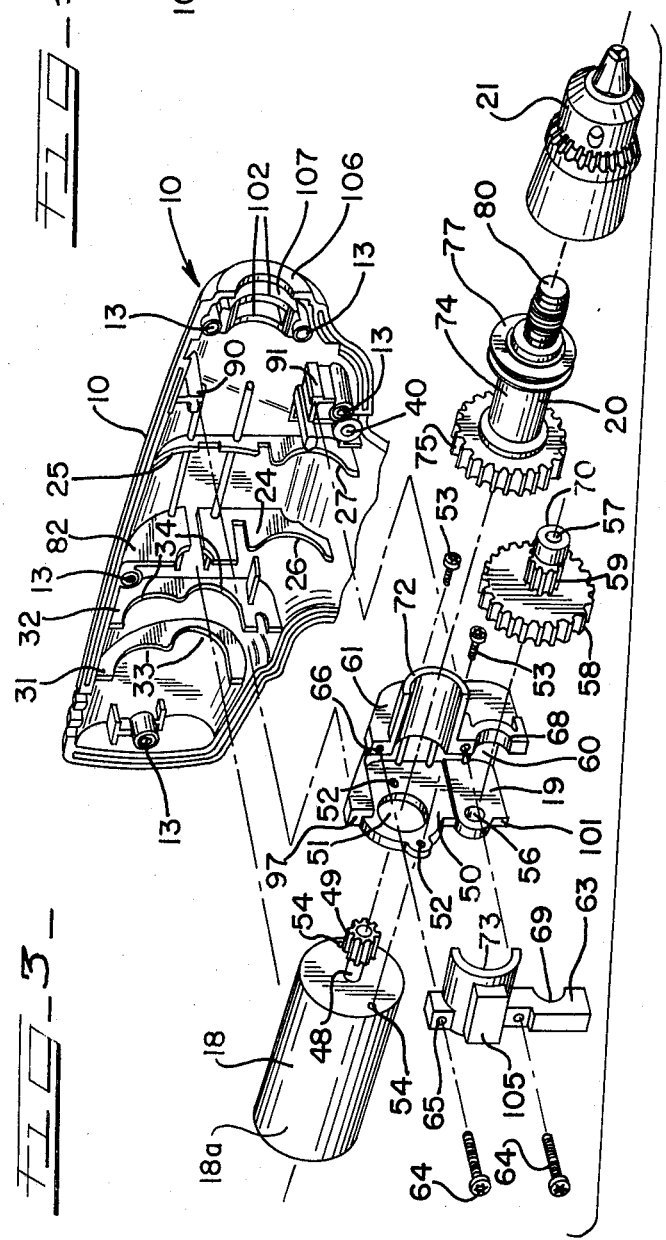
FIG-3-
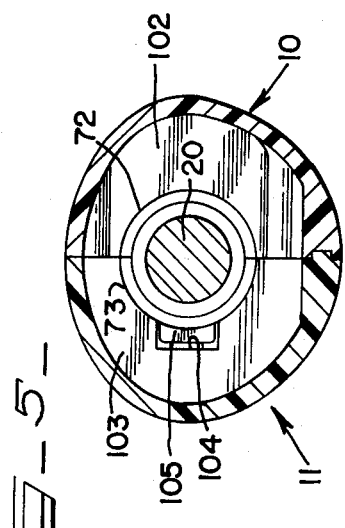
FIG-5-
FIG-6-

POWERED HAND-HELD TOOL WITH UNITARY SUB-ASSEMBLY MOUNTED BY THE TOOL HOUSING SECTIONS

BACKGROUND OF THE INVENTION

1. Field of the Invention

The field of the present invention relates to powered hand-held tools. More particularly, the field of the present invention relates to portable electric tools, such as drills. The present invention has particular, although not exclusive, application to a light-weight, cordless, electric drill of the reversible type which may also be used as a power screwdriver.

2. The Prior Art

So-called cordless drills are known in the prior art. However, these cordless drills have met with only limited commercial success. This lack of commercial succes has resulted from the bulk and weight of these tools as well as their high cost. The bulk and weight of these tools has resulted primarily from the size of the motor and the size and complexity of the gear train between the motor and chuck. The foregoing factors have also contributed to the high cost of these tools. An additional factor adding to high cost is the labor involved in manufacturing these tools.

These prior art cordless drills have also been handicapped in that they have not provided a sufficiently high output torque. Another disadvantage of the prior drills relates to the speed at which they operate; such drills have been manufactured to operate at a relatively high speed making many operations impossible to achieve. For example, because of these speed characteristics, it has not been possible to operate these power drills as power screwdrivers.

SUMMARY AND OBJECTS OF THE PRESENT INVENTION

The present invention may be summarized as relating to a new and improved drill having a uniquely mounted sub-assembly permitting low cost manufacture, such drill being of light-weight construction and being capable of performing both drilling and screwdriving functions.

Another object of the present invention is the provision of a new and improved powered hand-held drill having a uniquely mounted sub-assembly, which sub-assembly includes a gear box frame supporting a motor, a reduction gear train and a spindle.

Still another object of the present invention is the provision of a new and improved, light-weight, cordless drill, which drill may also act as a powered screwdriver.

Yet another object of the present invention is the provision of a new and improved drill having a unique sub-assembly, which sub-assembly is mounted in place in response to fastening of the drill housing sections together.

These and other objects and advantages of the present invention will become apparent from the following specification disclosing a preferred embodiment shown in the accompanying drawings.

DESCRIPTION OF THE DRAWINGS

FIG. 1 is a side elevational view of a powered hand-held drill embodying the present invention, with one of the clam-shell housing sections removed to illustrate the various internal parts of the drill;

FIG. 2 is a partial side elevational view of the inside of the housing shell which is not shown in FIG. 1;

FIG. 3 is a reduced, exploded, isometric view primarily illustrating the sub-assembly;

FIG. 4 is a section taken along the line 4—4 of FIG. 1, with certain parts, such as the batteries, not being shown, but with the other housing shell being shown in place;

FIG. 5 is a section taken along the line 5—5 of FIG. 1, with the other housing shell being shown attached; and FIG. 6 is a section taken along the line 6—6 of FIG. 1, again with the other housing section being shown in place.

DESCRIPTION OF A PREFERRED EMBODIMENT

Referring primarily to FIGS. 1 and 2, the present invention is shown embodied in a cordless electric drill. As mentioned above, the invention has particular, although not exclusive, application to such a drill. The housing of the drill consists of two clam-shell sections, generally designated 10 and 11. These housing sections, which are preferably made of plastic, are secured together by a plurality of screw type fasteners (not shown) which pass through apertures 12 in the housing section 10 and which are received in threaded bores 13 in the housing section 10. These housing sections, when joined together, form a substantially closed housing defined by a handle compartment 14 and a motor and gear compartment 15.

Referring to FIG. 3, a sub-assembly primarily includes an electric motor 18, a gear box frame 19, and a spindle 20, the latter mounting a drill bit chuck 21 of conventional design. The motor 18, which is self-contained in a housing 18a, is a D.C. electric motor which preferably has the following characteristics:

(1) a no-load speed of between 14,500–16,500 R.P.M. at 6.7 volts;
(2) a rated load of 2.8 oz.-in. at 8.0 amps;
(3) a locked rotor load of 20 oz.-in. at 40.0 amps.

The electric motor 18, in this preferred embodiment shown for purposes of illustration, is energized by a plurality of size "C" nickel cadmium batteries. In the preferred form of the invention, five such batteries are provided. Two batteries 22 are held together in side by side relationship by a band 23 and are suitably mounted within the drill housing. To this end, the housing shell 10 includes a pair of ribs 24 and 25 (FIG. 3) having respective arcuate recesses 26, 27 to receive one of the batteries 23. Three additional batteries 28 are secured together by a length of tape 29 and are suitably mounted in the drill housing. Again, the housing section 10 is provided with ribs 31, 32 having respective arcuate recesses 33, 34 for receiving the batteries 28.

The entire battery pack preferably has a nominal rating of 6.0 volts. Each battery has a capacity of 1.0 amphours and a charge rate of 120 milliamps, maximum.

The handle compartment 14 mounts an on-off switch 36 of conventional construction having an actuating button 37. A trigger 38, pivotally mounted by a pair of formations 39 received within bores 40 in the housing sections, has a portion thereof extending through an opening formed in the housing shells. The trigger, preferably made of plastic, has an integral, resilient extension 38a which engages a rib 41 formed on the housing shell 10; this extension acts to urge the trigger to its extended position. The trigger has a rearwardly extending formation 42 which engages the actuating button 37 thereby to move the switch 36 to the on position when the trigger is depressed.

The motor 18 is preferably of the reversible type. Thus, the cordless drill shown for purposes of illustration includes a forward-reverse switch 43 of conventional construction and including an actuating button 44, the latter extending through an opening defined by the housing sections 10 and 11. The position of the actuator 44 will of course determine the direction of rotation of the motor 18 upon depressing the trigger 38.

The handle section 14 also mounts a pair of pin type terminals, one such terminal being illustrated in FIG. 1 and designated 45. These terminals, which extend through an opening 46 in the handle of the drill, are adapted for engagement with one end of a cord (not shown) connected to a charging unit for purposes of recharging the batteries 22, 28.

Of course, it is understood that the pin type terminals 45, switches 36, 43, batteries 22, 28 and electric motor 18 are connected together with the appropriate lead wires to permit the recharging function and to cause energization of the motor 18 in the proper direction upon depressing of the trigger, after selecting the desired direction by actuation of the forward-reverse switch 44. This wiring is of conventional design and thus need not be specifically described herein.

Referring particularly to FIG. 3, the electric motor 18 has a centrally disposed output shaft 48 mounting a pinion gear 49. The gear box 19 is generally in the form of a U-shaped structure, preferably made of metal, having a first generally planar leg 50. This leg has an opening 51 for freely receiving the pinion gear 49. The leg 50 is also provided with a pair of bores 52 for receiving fasteners 53. The motor 18 includes a pair of threaded openings 54 receiving the fasteners 53; thus, it is apparent that the fasteners 53 serve to mount the motor 18 from the leg 50 of the gear box 19.

The leg 50 includes a further bore 56 which receives one end of a shaft 57, the latter mounting first and second gears 58 and 59. It will be understood that both gears 58, 59 are suitably mounted such that rotation imparted to the gear 58 will be transferred to the gear 59. The gear 58 is mounted for meshing engagement with the pinion gear 49 of the motor 18.

The gear box 19 is further defined by a bight portion 60 and a leg portion 61. Preferably, the leg 50, bight 60 and leg 61 are formed as an integral structure. The gear box 19 also includes a part 63 which is secured to the leg 61 by a pair of fasteners 64. These fasteners extend through bores 65 in the part 63 and are received in threaded openings 66 formed in the leg 61. The leg 61 and the part 63 have confronting semi-circular recesses 68, 69, respectively, which recesses define an opening for receiving a bearing 70 on one end of the shaft 57 thereby mounting the latter.

The leg 61 and the part 63 also have confronting semi-cylindrical formations 72, 73, which formations cooperate to define a bearing sleeve for rotatably receiving a cylindrical portion 74 of the spindle 20. The spindle mounts a gear 75 at one end thereof; this gear is in meshing engagement with the gear 59. The spindle 20 also includes a thrust bearing defined by a pair of annular members 77 with a plurality of ball bearings 78 held there between by an annular cage 79 (FIG. 1). Finally, the spindle 20 includes a threaded stud 80 mounting the chuck 21.

As seen in FIGS. 3 and 4, the housing shell 10 is provided with a further rib 82 co-planar with the rib 24. These ribs have arcuate mounting surfaces 83, 84 which engage a centrally disposed annular formation 85, the latter being part of the motor 18. As noted in FIG. 4, the housing shell 11 includes a pair of ribs 86, 87 having respective arcuate formations 88, 89 which also engage the annular formation 85 of the electric motor. Accordingly, when the housing sections 10 and 11 are fastened together, the aforementioned arcuate formations on the housing ribs engage and capture the annular formation 85 thereby aiding in mounting the motor in place.

The housing shell 10 includes a pair of further ribs or projections 90, 91, as best seen in FIGS. 3 and 6. The rib 90 is received within a recess or cavity 92 formed in the leg 50 of the gear box 19. Similarly, the rib 91 is received within a recess 93 also formed in the leg 50 of the gear box.

Referring to FIGS. 2 and 6, the housing shell 11 includes a rib formation or projection 95 having one end surface 96 arranged for abutting engagement with a surface 97 on the leg 50 of the gear box 19. Similarly, the housing shell 11 includes another rib formation or projection 99 having end surface 100 arranged for abutting engagement with a surface 101 formed on the leg 50. By referring to FIG. 6, it is seen that when the housing shells 10 and 11 are fastened together, the surfaces 96 and 100 are in snug, abutting engagement with the surfaces 97 and 101 of the gear box thereby holding the latter in place with the rib formations or projections 91 received in the recesses or cavities 92, 93.

As seen in FIG. 3, the housing shell 10 includes a pair of ribs 102 having arcuate recesses formed therein for engaging the semi-cylindrical formation 72 of the gear box member 19. In like manner, the housing section 11 is provided with a pair of ribs 103 (FIG. 2) which have arcuate surfaces for engaging the semi-cylindrical formation 73 of the gear box part 63. Additionally, the ribs 103 define a cavity 104 for receiving a projection 105 formed on the part 63.

As noted in FIG. 3, the housing shell 10 has a front wall portion 106 which, with the adjacent rib 102, defines a space 107 to receive the thrust bearing forming part of the spindle 20. Similarly, the housing section 11 includes a front wall portion 108 which, with the adjacent rib 103, defines a space 109 to receive this thrust bearing.

It should now be apparent that the entire sub-assembly consisting of the electric motor 18, gear box 19, spindle 20 and chuck 21, is mounted in place solely by reason of the various cooperating mounting projections and recesses formed on the housing sections and sub-assembly. Thus, separate means, such as fasteners, are not required for mounting the sub-assembly in place. This sub-assembly, which of course is assembled as a unit prior to mounting in the housing shell 10, is securely held in place as a consequence of attaching the two clam-shell housing sections together. This mounting feature, obviating, among other things, the need for additional parts, contributes greatly to low cost construction both as concerns materials and labor.

It should be observed that the gear box 19 mounts the spindle 20 and the output shaft of the motor 18 in coaxial relationship. This feature, which results in part from the double reduction drive train, contributes not only to compact design of the electric drill, but also to an optimum arrangement of the motor, vis-a-vis, the tool handle. This feature provides for better balance and handling of the tool and facilitates the creation of a pleasing aesthetic design.

In the embodiment shown for purposes of illustration, the gear train provides for a reduction of approximately 47:1. Thus, approximately 47 revolutions of the motor provide a single revolution to the drill chuck.

A drill constructed in accordance with the present invention and provided with a ⅜ inch chuck developed a maximum (stall) torque at the chuck approximately equal to the maximum torque of a conventional, cord-type, ¼ inch electric drill. The D.C. electric motor of the drill constructed in accordance with the present invention had approximately 0.062 horse power at the output shaft compared with the motor of a standard ¼ inch drill which develops approximately 0.25 horse power at the output shaft.

Because of the relatively low R.P.M. and high torque at the chuck of a drill constructed in accordance with the present invention, the latter may readily be used as a screwdriver when the appropriate attachment is mounted in the chuck. Of course, this screwdriver function is greatly enhanced since the motor 18 may be energized in both forward and reverse directions in response to movement of the actuator button 44; thus, screws may be both run and removed when the tool of this invention is used as a screwdriver.

The present invention also contributes to the very light weight of the tool. A tool embodying the present invention having plastic housing shells, and a gear box and the gears thereof formed of metal, has a total weight of only 2-¼ pounds.

We claim:

1. In a powered hand-held tool, the improvement comprising, in combination:
   (a) at least two tool housing sections;
   (b) fastening means connecting said housing sections together and thereby defining a substantially closed electric motor and gear compartment;
   (c) a unitary sub-assembly including:
      (1) rigid gear box frame means;
      (2) a self-contained electric motor including a housing, said motor having an output member at one end of the housing thereof, said motor housing being mounted on said frame means only at said one end thereof;
      (3) a spindle mounted on said frame means;
      (4) reduction gear means mounted by said frame means and operatively connecting said motor output member with said spindle;
   (d) first and second mounting means on said tool housing sections and sub-assembly, respectively, said first and second mounting means interengaging with each other in response to connecting said tool housing sections together with said sub-assembly positioned in said compartment, the interengagement of said first and second mounting means serving as the sole means mounting said sub-assembly in place in said compartment, said first mounting means including mounting elements on at least one of said tool housing sections and said second mounting means including a portion of said motor housing adjacent the other end thereof whereby said electric motor is mounted in place by said frame means at said one end thereof and by the interengagement of a portion of said first and second mounting means at the other end of said motor housing, said frame means serving as the primary support means for said spindle and said reduction gear means.

2. The improvement according to claim 1 further defined by:
   (a) said electric motor having a centrally disposed output shaft defining said output member;
   (b) said gear box frame means mounting said shaft and said spindle in co-axial relationship.

3. The improvement according to claim 1 wherein said spindle mounts a drill-bit chuck.

4. The improvement according to claim 1 further defined by:
   (a) said gear box frame means being in the form of a generally U-shaped structure having first and second parts;
   (b) second fastening means securing said first and second parts together thereby mounting said spindle from said frame means;
   (c) said U-shaped structure defining a space between the legs thereof and mounting said reduction gear means therein.

5. The improvement according to claim 4 further defined by:
   (a) said electric motor being mounted at said one housing end thereof by one of the legs of said U-shaped structure;
   (b) said spindle being mounted by the other leg of said U-shaped structure.

6. The improvement according to claim 5 wherein said reduction gear means is constituted by a double reduction drive train.

7. The improvement according to claim 1 wherein said first and second mounting means are formed at least in part by cavities and cooperating projections, said projections being held in said cavities as a consequence of connecting said housing sections together.

8. The improvement according to claim 7 wherein said housing sections are two in number and are in the form of clam-shell sections.

9. The improvement according to claim 1 further defined by:
   (a) said electric motor being a D.C. electric motor,
   (b) a plurality of batteries mounted within said housing sections and connected with said electric motor for energizing the latter.

* * * * *